(No Model.)

C. A. TATUM.
SYRINGE VALVE.

No. 342,478. Patented May 25, 1886.

WITNESSES:
A. Schehl.
Harry M. Turk

INVENTOR
Chas. A. Tatum
BY Briesen & Steele
ATTORNEYS

UNITED STATES PATENT OFFICE.

CHARLES A. TATUM, OF NEW YORK, N. Y., ASSIGNOR TO WHITALL, TATUM & CO., OF SAME PLACE.

SYRINGE-VALVE.

SPECIFICATION forming part of Letters Patent No. 342,478, dated May 25, 1886.

Application filed April 19, 1886. Serial No. 199,371. (No model.)

*To all whom it may concern:*

Be it known that I, CHARLES A. TATUM, a resident of New York city, in the county and State of New York, have invented an Improved Valve Seat for the End of Rubber Tubes, of which the following is a full, clear, and exact description reference being made to the accompanying drawings, in which—

Figure 1:
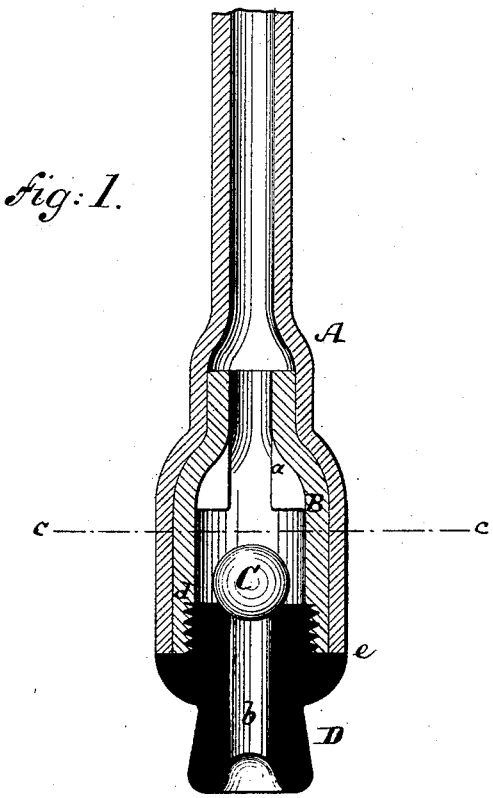
Figure 2:
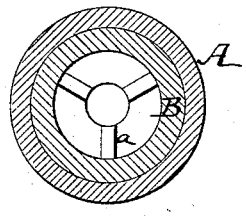

Figure 1 represents an enlarged sectional view of the end of a rubber tube containing my improved valve-seat. Fig. 2 is a horizontal section on the line $c\ c$, Fig. 1.

The object of this invention is to provide syringes and other structures employing valves in flexible tubes with elastic ends, that shall constitute the seats or supports for the valves.

The invention substantially consists in the use of an elastic rubber plug screwed or pushed into the metal lining of the end of the tube, as hereinafter stated.

In the drawings, the letter A represents an india-rubber tube of the kind used in syringes and analogous structures. This tube is drawn around the metal box B, which incloses the ball-valve C, and which is arranged to prevent the ball from dropping into the rubber tube.

D is a plug, made of soft india-rubber, with a central bore, $b$, through which the liquid can enter the tube A. This elastic rubber plug D, at its inner portion, is screw-threaded, as at $d$, and has a shoulder below the screw-thread, as at $e$. It can be screwed or pushed into the metallic socket B, which is threaded to receive it, while its shoulder $e$ bears against the end of that socket, and, if desired, also against the end of the tube A. The ball-valve C finds its seat on the inner end of the elastic rubber plug D. I am thus in position to use a ball-valve instead of a spindle-valve, and the said ball-valve will fit the elastic seat even if it should not be turned quite true.

In addition to the advantage which I derive from the use of this elastic valve-seat—namely, that of being able to use a ball-valve that is not turned absolutely true—the following advantages also flow from the use of my invention: The projecting end of the syringe or other article carrying the elastic plug D is not apt to break glass or other vessels into which it may be thrown; it is noiseless, and therefore not apt to annoy nervous patients, and it does not present to the liquid into which it is dipped any deteriorating substance, no metal being on the outside of the syringe.

Instead of the screw-thread $d$, the plug may have any other well-known retaining-surface.

I claim—

The combination of the rubber tube A and its metal lining B with the tubular elastic rubber plug D, having retaining portion $d$, and with the valve C, which is seated on said elastic plug, as described.

CHARLES A. TATUM.

Witnesses:
 THOS. J. POWERS,
 CHARLES G. M. THOMAS.